3,147,251
19-OXYGENATED STEROIDS AND PROCESS FOR THEIR MANUFACTURE
Oskar Jeger and Kurt Schaffner, Zurich, Switzerland, assignors to Ciba Corporation, New York, N.Y., a corporation of Delaware
No Drawing. Filed July 19, 1962, Ser. No. 211,103
Claims priority, application Switzerland July 21, 1961
20 Claims. (Cl. 260—239.55)

The present invention provides a new process for the manufacture of 19-oxygenated 11-oxo-steroids from 19-unsubstituted 11-oxo compounds. The substances prepared by the present process are biologically active; inter alia, for example, 3:11:20-trioxo-19-hydroxy-5α-pregnane and its derivatives substituted in position 21 inhibit the sodium retention caused by corticoids (see U.S. Patent No. 2,975,173). Furthermore, they are important intermediates for the manufacture of the likewise pharmacologically active $\Delta^4$-3-oxo-11β-hydroxy- and 11-oxo-19-nor-steroids or of $\Delta^{4:9(10)}$-3-oxo-steroid-dienes. Particularly valuable are the 19-nor compounds of the androstane series; inter alia, for example, several derivatives of $\Delta^4$-11β:17β-dihydroxy-17α-methyl-19-nor-androstene (see British Patent No. 847,713; Canadian Patent Nos. 594,-742, 594,743 and 594,515) display an anabolic, androgenic and antioestrogenic action.

Hitherto, all these compounds were accessible only from cardanolides substituted in position 11 or 12, or by way of the intermediately formed 11-unsubstituted 19-nor-steroids (formed by reducing steroids with an aromatic ring which in their turn had to be prepared from unsaturated 3-keto-steroids by thermal elmination of the C–19-methyl group and simultaneous aromatisation). It was possible to introduce the 11-oxygen function by the microbiological route.

The present invention is based on the observation that 19-oxygenated 11-oxo-steroids can be obtained by a novel, simpler process by irradiating 19-unsubstituted 11-oxo-steroids that contain a free oxo group only in position 11 with ultra-violet light in a solvent, the 11-hydroxy-11:19-cyclo-steroid compound so formed then being treated in an inert solvent with an oxidizing heavy-metal acylate, in any resulting 11-oxo-19-acyloxy steroid the acyloxy group is hydrolysed and, if desired, the 11-oxo-19-hydroxy-steroid formed oxidized in known manner to an 11:19-dioxo steroid or 11-oxo-steroid-19-acid. The process can be represented by the following partial formulae:

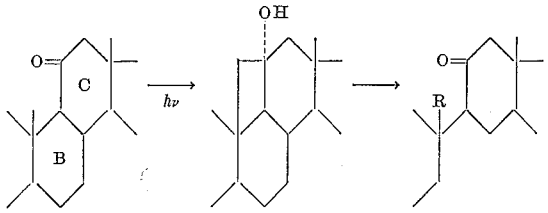

R=CH$_2$—O Acyl, —CH$_2$—OH, —CHO, —COOH.

The irradiation according to the present invention of the 11-oxo-steroids is advantageously performed in an organic solvent, preferably in an aliphatic and/or cyclo-aliphatic hydrocarbon such, for example, as pentane, hexane, cyclohexane or methylcyclohexane; equally suitable are lower aliphatic alcohols such as methanol, ethanol, propanol, butanol or the like, as well as ethers such as methyl ether, or dioxane, or lower carboxylic acids such as acetic or propionic acid.

Suitable light sources are artificial or strong natural light; it is of advantage to use ultra-violet light such as is produced by mercury high-pressure lamps, or strong sunlight. The irradiation is generally carried out at a temperature ranging from —10 to +80° C.

For the conversion according to the invention of the 11α-hydroxy-11:19-cyclosteroids formed by irradiation into 11-oxo-19-acyloxy compounds there may be used oxidizing heavy-metal acylates, more especially acylates of tetravalent lead, such, for example, as lead tetraacetate, tetrabenzoate, or tetrapropionate. The reaction is carried out in a solvent that is inert towards the reagents used, preferably in an aliphatic, cycloaliphatic, or aromatic hydrocarbon such as pentane, hexane, cyclohexane, methylcyclohexane or benzene, or in a halogenated hydrocarbon, for example carbon tetrachloride. In most cases the 11-oxo-19-acyloxy steroids undergo hydrolysis even on simple chromatography on alumina, but it can also be brought about by treating the compounds with bases under known conditions, for example with an alcoholic solution of an alkali metal hydroxide.

When the subsequent oxidation of the 11-oxo-19-hydroxysteroids is carried out for example with chromium tri-oxide in a basic medium, for example in pyridine, there are obtained 11:19-dioxo-compounds, while when chromium trioxide in an acid solution, for example Kiliani solution, is used, 11-oxo-steroid-19-acids are obtained.

As starting materials for the present process there may be used 11-oxo-steroid compounds of the androstane, pregnane, cholane, cholestane, spirostane or cardanolide series which may contain further substituents in the cyclic system, more especially in one or several of the positions 1, 2, 3, 4, 5, 6, 7, 8, 9, 12, 14, 15, 16, 17, 18, 20, 21, 22 and 23, such as functionally converted oxo groups, or free, esterified or etherified hydroxyl groups, or alkyl (for example methyl) groups and/or halogen atoms. Functionally converted oxo groups are ketalized oxo groups or oxo groups converted into enol derivatives, for example enolethers or enolesters. Furthermore, the starting materials may contain double bonds, for example in positions 5, 6, 13, 16 and in the side chain, or they may also contain oxido groups.

Particularly important starting materials are 11-oxo-compounds of the androstane and pregnane series, for example:

$\Delta^5$-3:17-diacetoxy-11-oxo-androstene,
3:17-bis-ethylenedioxy-11-oxo-5α- and -5β-androstane,
$\Delta^5$-3:17-bis-ethylenedioxy-11-oxo-androstene,
3-ethylenedioxy-11-oxo-17β-hydroxy-5α- and -5β-androstane,
$\Delta^5$-3-ethylenedioxy-11-oxo-17β-hydroxy - androstene and its esters, for example the acetate, propionate, β-phenylpropionate, decanoate and the like,
$\Delta^5$-3-ethylenedioxy-11-oxo-17β-hydroxy-17α-alkyl-, - 17α-alkenyl- and -17α-alkinyl-androstenes, more especially the 17α-methyl, 17α-ethyl, 17α-vinyl, 17α-ethinyl compounds and their esters; furthermore
3α-acetoxy-11-oxo-20-ethylenedioxy-5β-pregnane,
3:20-bis-ethylenedioxy-11-oxo-5α- and -5β-pregnane,
$\Delta^5$-3:20-bis-ethylenedioxy-11-oxo-pregnene,
$\Delta^5$-3:20-bis-ethylenedioxy-21-hydroxy-pregnene and its esters.

Any starting material that is not known can be prepared by a known method.

The present invention further provides 11α-hydroxy-11:19-cyclosteroids, primarily those of the androstane and pregnane series, more especially those of the formulae

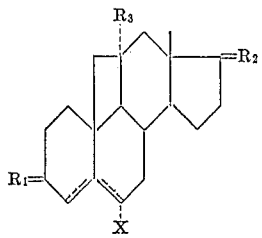

and

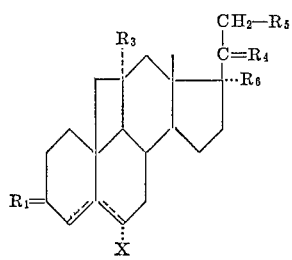

in which $R_1$ and $R_4$ each represents an oxo group or a lower alkylenedioxy group, $R_2$ represents an oxo group, a lower alkylenedioxy group or a free or esterified hydroxyl group in β-position together with a hydrogen atom or a lower alkyl, lower alkenyl or lower alkinyl radical, $R_3$ represents a free or esterified hydroxyl group, $R_5$ and $R_6$ each represents a hydrogen atom or a free or esterified hydroxyl group and X stands for a hydrogen, fluorine or chlorine atom or a methyl group, and their unsaturated derivatives having a double bond extending from the 5-position. Particular mention may be made of:

$\Delta^4$-3:17-dioxo-11α-hydroxy-11:19-cycloandrostene and its 3:17-bis-ethyleneketal and their esters, $\Delta^4$-3-oxo-11α:17β-dihydroxy-11:19 - cycloandrostene, its 3-ethylene ketal and their esters, $\Delta^4$-3-oxo-11α:17β-dihydroxy-11:19-cyclo-17α-lower alkyl-androstenes, their 3-ethylene ketals and esters, more especially $\Delta^4$ - 3 - oxo-11α:17β-dihydroxy-11-:19-cyclo-17α-methyl-, 17α-ethyl-, 17α-vinyl- and 17α-ethinyl-androstane and their esters; furthermore $\Delta^4$ - 3:20-dioxo - 11α - hydroxy-11:19-cyclopregnene, its 3-mono- and 3:20-bis-ethylene ketals and their esters, 3:20-dioxo-11α-hydroxy-11:19-cyclo-5α-pregnene and its 3:20-bis-ethylene ketal, 3:20-dioxo-11α-hydroxy-11:19-cyclo-5β-pregnane and its 3:20-bis-ethylene ketal and their esters, and also $\Delta^4$-3:20-dioxo-11α:21-dihydroxy-11:19-cyclopregnene, its 3:20-bis-ethylene ketal and their esters.

The acid radicals in the esters mentioned above are more especially those of aliphatic, cycloaliphatic, araliphatic or aromatic carboxylic acids containing 1 to 15 carbon atoms, for example formates, acetates, propionates, butyrates, trimethylacetates, oenanthates, caproates, decanoates, cyclopentylpropionates, valerates, benzoates, furoates, hexahydrobenzoates, phenylpropionates, trifluoroacetates or the like.

The conversion of the new 19-hydroxy, 19-oxo compounds of 19-acids into the corresponding, pharmacologically active 19-nor-compounds is performed by heating them with a base or acid, if desired after having introduced the requisite $\Delta^4$-3-oxo grouping by a known method.

Any resulting $\Delta^4$-3:11-dioxo-19-nor-steroids may be converted, after partial ketalization, by reduction, for example with lithium aluminum hydride, into the corresponding 11β-hydroxy compounds from which by elimination of water, subsequent ketal cleavage and usually simultaneous isomerization of the $\Delta^{4:9(11)}$-3-oxo-19-nor steroids formed, the pharmacologically active $\Delta^{4:9(10)}$-3-oxo-nor-steroid-dienes are obtained.

The following examples illustrate the invention.

*Example 1*

19.20 grams of $\Delta^5$-3:20-bis-ethylenedioxy-11-oxo-pregnene are irradiated in 4 batches of 4.8 grams each in 1200 cc. of cyclohexane each for 24 hours with a mercury high-pressure lamp. The solvent is evaporated under vacuuum and yellow oil is separated on a column of 30 times its own weight of neutral alumina of activity II into a benzene fraction, an ether fraction and a methanol fraction.

The crystalline benzene fraction (12.3 grams) consists of unreacted starting material as is revealed by its mixed melting point and infra-red spectrum.

The ether fraction (3.885 grams) is taken up in benzene and chromatographed on 117 grams of neutral alumina of activity II. Mixtures of benzene+ether (9:1), (3:1) and (1:1), and a mixture of ether+methanol (9:1) elute a total of 1925 mg. of an oily substance which displays in the infra-red spectrum in chloroform a band at 3610 cm.$^{-1}$ (hydroxyl group) but no carbonyl absorption. The product is the oily $\Delta^5$-3:20-bis-ethylenedioxy-11α-hydroxy-11:19-cyclopregnene.

*Example 2*

A solution of 1.925 grams of $\Delta^5$-3:20-bis-ethylenedioxy-11α-hydroxy-11:19-cyclopregnene in 32 cc. of glacial acetic acid, 24 cc. of methanol and 8 cc. of water is heated for 7 minutes at 60° C. The reaction mixture is then poured into ether and the organic phase is washed with saturated sodium bicarbonate solution and then with water, dried and evaporated under vacuum. The residue is recrystallized three times from methanol and yields $\Delta^5$ - 3 - ethylenedioxy - 11α - hydroxy - 20 - oxo - 11:19-cyclopregnene melting at 202–205° C. Optical rotation $[\alpha]_D = +120°$ (c.=1.13 in chloroform). Infra-red spectrum in chloroform: bands at 3610 and 1698 cm.$^{-1}$. Nuclear magnetic resonance spectrum in deuteriochloroform: signals at 0.76, 2.12, 3.95 (all singlets) and at about 5.68 parts per million (multiplets).

*Example 3*

A solution of 105 mg. of $\Delta^5$-3-ethylenedioxy-11-hydroxy-20-oxo-11:19 cyclopregnene in 4 cc. of glacial acetic acid, 3 cc. of methanol and 1 cc. of water is heated for 1½ hours at 80° C. Usual working up yields 87 mg. of an oil which is purified by chromatography on 2.5 grams of neutral alumina of activity II. 36 mg. of unreacted starting material are isolated, whereupon a 9:1-mixture of benzene and ether elutes 29 mg. of an oil consisting of $\Delta^4$- and $\Delta^5$-3:20-dioxo-11-hydroxy-11:19-cyclopregnene. Its infra-red spectrum in chloroform contains bands at 3560, 1698, 1662 and 1600 cm.$^{-1}$, while its ultra-violet spectrum contains a maximum at 253 m$\mu$ ($\epsilon$=5650). Nuclear magnetic resonance spectrum in deuteriochloroform: signals at 0.79, and 2.11 (both singlets), at about 5.73 (multiplet) and 6.56 parts per million (singlet).

*Example 4*

A solution of 47 mg. of $\Delta^5$-3-ethylenedioxy-11α-hydroxy-20-oxo-11:19-cyclopregnene in 2 cc. of acetic anhydried and 2 cc. of pyridine is kept for 10 days at room temperature. The reaction mixture is then evaporated under vacuum, to yield 38 mg. of $\Delta^5$-3-ethylenedioxy-11α-acetoxy-20-oxo-11:19-cyclopregnene which, after having been recrystallized three times from methanol, melts at 168 to 168.5° C. Infra-red spectrum in chloroform: bands at 1720, 1695 and 1250 cm.$^{-1}$.

*Example 5*

8 mg. of $\Delta^5$-3-ethylenedioxy-11α-acetoxy-20-oxo-11:19-cyclopregnene are kept for 41 hours at room temperature in 15 cc. of methanolic potassium hydroxide solution of 5% strength. Conventional working up gives a quantitative yield of crystals melting at 193 to 199° C. which, according to their mixed melting point and infra-red spectrum, are identical with Δ⁵-3-ethylenedioxy-11-hydroxy-20-oxo-11:19-cyclopregnene.

*Example 6*

A solution of 43 mg. of Δ⁵-3-ethylenedioxy-11α-acetoxy-20-oxo-11:19-cyclopregnene in 2 cc. of glacial acetic acid, 2 cc. of methanol and 0.3 cc. of 2 N-hydrochloric acid is hydrolysed for 3 hours at 60 to 70° C. and then for another 24 hours at room temperature. Conventional working up yields an oily crude product (37 mg.) which is purified by chromatography on 1.2 grams of neutral alumina of activity II. Elution with a 9:1-mixture of benzene and ether yields 15 mg. of Δ⁴-3:20-dioxo-11-acetoxy-11:19 cyclopregnene which, after having been recrystallized twice from methylene chloride+ether, melts at 191.5 to 192° C. Infra-red spectrum in chloroform: bands at 1725, 1700–1675, 1590 and 1250 cm.⁻¹. Ultraviolet spectrum: maximum at 263 mμ (ε=8620).

*Example 7*

A solution of 2.0 grams of Δ⁵-3-ethylenedioxy-11-oxo-17α-methyl-17β-acetoxyandrostene in 1 liter of hexane is irradiated for 24 hours with a mercury high-pressure burner at 25° C. The solvent is evaporated under vacuum and the oily residue is taken up in benzene and chromatographed on 30 times its own weight of alumina of activity II. Benzene elutes unreacted starting material. The combined ether eluate (270 mg.) are once more subjected to chromatographic purification. Mixtures of ether and benzene produce a yield of 115 mg. of Δ⁵-3-ethylenedioxy - 11α - hydroxy - 17α - methyl - 17β - acetoxy-11:19-cycloandrostene. Its infra-red spectrum contains inter alia bands at 3630 and 1735 cm.⁻¹.

*Example 8*

8.37 grams of 3:20-bis-ethylenedioxy-11-oxo-5β-pregnane (melting at 141 to 142° C.) are irradiated in three batches in 1.2 litres of cyclohexane each for 24 hours with a mercury high-pressure burner. The solvent is evaporated under vacuum and the oily crude product of these three batches is separated on a column of 30 times its own weight of neutral alumina of activity II into a benzene eluate, an ether eluate and a methanol eluate.

The benzene fraction (7.405 grams) consists of unreacted crystalline starting material which can be identified by its mixed melting point and its infra-red spectrum.

The infra-red spectrum in chloroform of the oily methanol fraction (745 mg.) displays bands at 3580 and 1710 cm.⁻¹ (intensity only about 40%).

The oily ether eluate (1.117 grams) is further broken down by chromatography on 33 grams of neutral alumina of activity II. Benzene elutes 361 mg. of an oil which gives a positive reaction to tetranitromethane and its infra-red spectrum in chloroform contains a strong carbonyl band at 1695 cm.⁻¹. From further benzene fractions and 9:1-benzene+ether fractions 231 mg. of an oil are isolated which is again purified on 7 grams of neutral alumina of activity II and then deketalized in a benzene solution (132 mg.) in a mixture of 4 cc. of glacial acetic acid, 8 cc. of methanol and 2 cc. of water for 2 hours at 60° C. Conventional working up produces 110 mg. of a crystalline compound of unknown constitution which, after having been repeatedly recrystallized from ether +petroleum ether, melts at 149.5 to 150° C. Infra-red spectrum in chloroform: bands at 3560 and 1698 cm.⁻¹.

| $C_{21}H_{30}O_3$ | C, percent | H, percent |
|---|---|---|
| Calculated | 76.32 | 9.15 |
| Found | 76.50 | 9.00 |

Benzene+ether 9:1, ether, and ether+methanol (9:1) elute a total of 452 mg. of oily crystals which, after having been recrystallized twice from ether+petroleum ether, melt at 165 to 165.5° C. Infra-red spectrum in chloroform: band at 3640 cm.⁻¹. Nuclear magnetic resonance spectrum in deuteriochloroform: δ=0.91, 1.29 and 3.91 parts per million (all singlets).

The product is the 3:20-bis-ethylenedioxy-11α-hydroxy-5β-11:19-cyclo-pregnane.

*Example 9*

A solution of 2 grams of 3:20-bis-ethylenedioxy-11-oxo-5α-pregnane in 1300 cc. of cyclohexane is irradiated for 20 hours with a mercury high-pressure burner and then evaporated under vacuum. The resulting oil is separated on a column of 30 times its own weight of neutral alumina of activity II into the following fractions:

(1) Benzene fraction (700 mg.): By another chromatography on 21 grams of neutral alumina of activity II there are obtained with petroleum ether+benzene (1:1) 60 mg. of crystals which produce a yellow color reaction with tetranitromethane. The infra-red spectrum in chloroform of this compound contains no absorption bands of carbonyl or hydroxyl groups. With 2:4-dinitrophenylhydrazine a derivative is obtained which, after three recrystallizations from methylene chloride+methanol, begins to decompose above 180° C. and then melts at 209 to 210° C.

Found: C, 58.30; H, 6.19%.

(2) Benzene fraction (800 mg.): Crystals which, according to their melting point, mixed melting point and thin-layer chromatogram, are identical with the starting material.

(3) Ether fraction (900 mg.): Renewed chromatographic purification on neutral alumina of activity II isolates 543 mg. of starting material with benzene and a 9:1-mixture of benzene and ether. Further elution with the latter mixture and with a 1:1-mixture produces 100 mg. of a substance which, after three recrystallizations from acetone+petroleum ether, melts at 178 to 179° C. Infra-red spectrum in chloroform: band at 1710 cm.⁻¹.

Found: C, 71.81; H, 9.19%.

50 mg. of this compound in 10 cc. of methanolic potassium hydroxide solution of 5% strength are refluxed for 2 hours. After conventional working up it is possible to isolate quantitatively starting material which is identified by its melting point (178° C. after crystallization from acetone+petroleum ether), mixed melting point and thin-layer chromatogram.

(4) Ether fraction (180 mg.): After having been recrystallized three times from acetone+petroleum ether the crystalline product melts at 196 to 197° C. Infra-red spectrum in chloroform: band at 3610 cm.⁻¹. Nuclear magnetic resonance spectrum in deuteriochloroform: δ=0.89, 1.28 and 3.90 parts per million (all singlets).

The product is the 3:20-bis-ethylenedioxy-11α-hydroxy-11:19-cyclo-5α-pregnane.

*Example 10*

170 mg. of 3:20-bis-ethylenedioxy-11α-hydroxy-11:19-cyclo-5α-pregnane are heated in 5 cc. of glacial acetic acid, 5 cc. of methanol and 5 drops of water for 1½ hours at 60° C. The crude 3:20-dioxo-11α-hydroxy-11:19-cyclo-5α-pregnane (160 mg.) obtained by conventional processing is recrystallized twice from methylene chloride+isopropyl ether and melts at 122–123° C. Infra-red spectrum in chloroform: bands at 3610 and 1700 cm.⁻¹. Nuclear magnetic resonance spectrum in deuteriochloroform: δ=0.78 and 2.13 parts per million (both singlets). By the same method from the corresponding 5β-isomer there is obtained the 3:20-dioxo-11α-hydroxy-11:19-cyclo-5β-pregnane melting at 173° C.; optical rotation [α]_D=+1° (c.=0.88 in CHCl₃).

Example 11

40 mg. of 3:20-bis-ethylenedioxy-11α-hydroxy-11:19-cyclo-5α-pregnane in 5 cc. of acetic anhydride+pyridine (1:1) are kept for 7 days at room temperature, then evaporated under vacuum and the residue is recrystallized twice from ether+hexane. The resulting 3:20-bis-ethylenedioxy-11α-acetoxy-11:19-cyclo-5α-pregnane has a double melting point at 83–85° and 119 to 120° C. Infra-red spectrum in chloroform: bands at 1725 and 1260 cm.$^{-1}$.

Example 12

A solution of 20 mg. of 3:20-bis-ethylenedioxy-11α-hydroxy-11:19-cyclo-5α-pregnane in pyridine is added dropwise to a solution of 20 mg. of chromium trioxide in a small quantity of pyridine and the whole is kept for 24 hours at room temperature and then filtered. The filter residue is washed with benzene, the filtrate taken up in either and the organic phase is washed with sodium bicarbonate solution and with water, dried and evaporated. A quantitative yield of a crystallin product is obtained which, according to its melting point, mixed melting point and thin-layer chromatogram, consists of unreacted starting material.

Example 13

400 mg. of lead tetraacetate are dried for ½ hour in a high vacuum at room temperature, then mixed with 150 mg. of calcimum carbonate in 10 cc. of absolute benzene and the whole is heated to the boil and then cooled. 220 mg. of 3:20-bis-ethylenedioxy-11α-hydroxy-11:19-cyclo-5α-pregnane in 10 cc. of absolute benzene are added and the mixture is refluxed overnight, then poured into water and extracted with ether. The isolated, partially crystalline, crude 3:20-bis-ethylenedioxy-11-oxo-19-acetoxy-5α-pregnane (240 mg.) is chromatographed on neutral alumina of activity II, and at the same time the acetate residue is hydrolysed. Benzene and mixtures of benzene+ether (9:1)-to-(1:1) elute 110 mg. of 3:20-bis-ethylenedioxy-11 - oxo - 19-hydroxy-5α-pregnane which, after two recrystallizations from acetone+petroleum ether, displays a constant melting point of 188–189° C. Infra-red spectrum in chloroform: bands at 3380 and 1695 cm.$^{-1}$. Nuclear magnetic resonance spectrum in deuteriochloroform: δ=0.75, 1.25, 3.78 and 3.93 parts per million (all singlets).

In an analogous manner starting from Δ$^5$-3-ethylenedioxy - 11α - hydroxy - 17α - methyl-17β-acetoxy-11:19-cyclo-androstene there is obtained Δ$^5$-3-ethylenedioxy-11-oxo-17α-methyl-17β-acetoxy-19-hydroxy-androstene; from Δ$^5$-3:20-diethylenedioxy-11α - hydroxy - 11:19-cyclo-pregnene there is obtained Δ$^5$-3:20-diethylenedioxy-11-oxo-19-hydroxy-pregnene melting at 191–192° C., optical rotation [α]$_D$=+43° (c.=0.49 in CHCl$_3$) and from 3:20-diethylene-dioxy-11α-hydroxy - 11:19 - cyclo-5β-pregnane there is obtained 3:20 - diethylenedioxy - 11 - oxo - 19-hydroxy-5β-pregnane melting at 177° C.; optical rotation [α]$_D$=+21° (c.=0.86 in CHCl$_3$).

Example 14

25 mg. of 3:20-bis-ethylenedioxy-11-oxo-19-hydroxy-5α-pregnane in a small quantity of pyridine are treated overnight at room temperature with 25 mg. of chromium trioxide and then filtered and the filtrate is processed in conventional manner, to yield 15 mg. of an oil which has the constitution of 3:20-bis-ethylenedioxy-11:19-dioxo-5α-pregnane; it gives a positive Tollens reaction and its infra-red spectrum in chloroform contains bands at 1715 and 1695 cm.$^{-1}$.

Example 15

40 mg. of 3:20-bis-ethylenedioxy-11-oxo-19-hydroxy-5α-pregnane are deketalized for 1 hour at 60° C. in a mixture of 5 cc. glacial acetic acid and 10 drops of water. The reaction mixture is then taken up in water and extracted with ether, to yield 35 mg. of a crystalline crude product. After having been recrystallized twice from methylene chloride+hexane the resulting 3:11:20-trioxo-19-hydroxy-5α-pregnane melts at 197–198° C. Optical rotation: [α]$_D^{24}$=+98.5° (c.=0.558 in chloroform). Infra-red spectrum in chloroform: bands at 3440 and 1710 cm.$^{-1}$.

In an analogous manner Δ$^5$-3:20-diethylenedioxy-11-oxo-19-hydroxy-pregnene may be hydrolysed to Δ$^4$-3:11:20-trioxo-19-hydroxy-pregnane melting at 202–203° C.; optical rotation [α]$_D$=+243° (c.=0.52 in CHCl$_3$).

Example 16

28 mg. of 3:11:20-trioxo-19-hydroxy-5α-pregnane in 1 cc. of glacial acetic acid and 0.1 cc. of water are treated, while being cooled, with 0.1 cc. of Kiliani solution, and the whole is kept for 2 hours at room temperature. The excess chromium trioxide is decomposed with 3 drops of methanol. The mixture is then taken up in ether and washed with sodium bicarbonate solution and with water. Yield: 2.5 mg. of an oily neutral substance.

The basic washings are acidified with dilute hydrochloric acid and extracted with ether, to yield 17 mg. of crude 3:11:20-trioxo-5α-pregnane-19-acid which, on crystallization from acetone+hexane, forms crystals melting at 196–197° C. Infra-red spectrum in chloroform: bands at 3500, 1840, 1792 and 1725 cm.$^{-1}$.

What is claimed is:

1. A process for the manufacture of 19-hydroxy steroids, wherein a 19-unsubstituted 11-oxo-steroid that contains a free oxo group only in position 11 is irradiated with ultra-violet light in a solvent, an 11-hydroxy-11:19-cyclo-steroid formed is treated in an inert solvent with an acylate of tetravalent lead and in any resulting 11-oxo-19-acyloxy-steroid obtained the acyloxy group hydrolysed.

2. A process as claimed in claim 1, wherein irradiation is carried out in an organic solvent.

3. A process as claimed in claim 2, wherein irradiation is carried out in a member selected from the group consisting of an aliphatic and cycloaliphatic hydrocarbon.

4. A process as claimed in claim 1, wherein irradiation is carried out at a temperature between −10° C. and +80° C.

5. A process as claimed in claim 1, wherein a lead tetra-acylate is used as the tetravalent lead acylate.

6. A process as claimed in claim 5, wherein lead tetraacetate is used.

7. A member selected from the group consisting of a compound of the formula

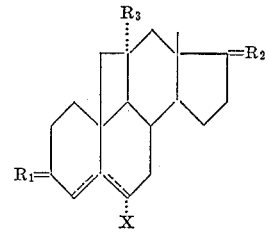

in which R$_1$ represents a member selected from the group consisting of oxo and lower alkylenedioxy, R$_2$ represents a member selected from the group consisting of oxo, lower alkylenedioxy, and the groups

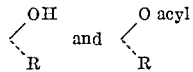

in which R stands for a member selected from the group consisting of hydrogen, lower alkyl, lower alkenyl and lower alkinyl, R$_3$ stands for a member selected from the group consisting of hydroxy and acyloxy and X for a member selected from the group consisting of hydrogen, fluorine, chlorine and methyl, and an unsaturated derivative thereof having a double bond extending from the 5-position, said double bond being a 4:5-double bond when R$_1$ is oxo and a 5:6-double bond when R$_1$ is lower alkylenedioxy.

8. A member selected from the group consisting of Δ⁴-3:17-dioxo-11α-hydroxy - 11:19 - cycloandrostene, its 3:17-bisethyleneketal and an ester thereof with a carboxylic acid containing up to 15 carbon atoms.

9. A member selected from the group consisting of Δ⁴-3-oxo-11α:17β-dihydroxy - 11:19 - cycloandrostene, its 3-ethyleneketal and an ester thereof with a carboxylic acid containing up to 15 carbon atoms.

10. A member selected from the group consisting of a Δ⁴-3-oxo-11α:17β - dihydroxy - 11:19 - cyclo - 17α - lower alkyl-androstene, its 3-ethyleneketal and an ester thereof with a carboxylic acid containing up to 15 carbon atoms.

11. A member selected from the group consisting of Δ⁴-3-oxo - 11α:17β - dihydroxy - 11:19-cyclo-17α-methyl-androstene, its 3-ethyleneketal and an ester thereof with a carboxylic acid containing up to 15 carbon atoms.

12. A member selected from the group consisting of a saturated 11α - hydroxy - 11:19 - cyclopregnane, an ester thereof with a carboxylic acid containing up to 15 carbon atoms and an unsaturated derivative in which the double bond extends from the 5-position.

13. A member selected from the group consisting of a compound of the formula

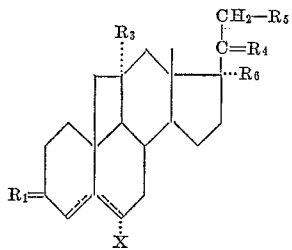

in which $R_1$ and $R_4$ each represents a member selected from the group consisting of oxo and lower alkylenedioxy, $R_3$ represents a member selected from the group consisting of hydroxy and acyloxy, $R_5$ and $R_6$ each stands for a member selected from the group consisting of hydrogen, hydroxy and acyloxy and X for a member selected from the group consisting of hydrogen, fluorine, chlorine and methyl, and an unsaturated derivative thereof having a double bond starting from the 5-position, said double bond being a 4:5-double bond when $R_1$ is oxo and a 5:6-double bond when $R_1$ is lower alkylenedioxy.

14. A member selected from the group consisting of 3:20-dioxo-11α-hydroxy-11:19 - cyclo - 5α - pregnane, its 3:20-bisethyleneketal and an ester thereof with a carboxylic acid containing up to 15 carbon atoms.

15. A member selected from the group consisting of 3:20-dioxo-11α-hydroxy - 11:19 - cyclo - 5β - pregnane, its 3:20-bisethyleneketal and an ester thereof with a carboxylic acid containing up to 15 carbon atoms.

16. A member selected from the group consisting of Δ⁴-3:20-dioxo-11α-hydroxy-11:19-cyclo-pregnene and an ester thereof with a carboxylic acid containing up to 15 carbon atoms.

17. Δ⁴-3:20-dioxo-11α-acetoxy-11:19-cyclopregnene.

18. A member selected from the group consisting of Δ⁵-3-ethylenedioxy-11α - hydroxy - 20 - oxo - 11:19-cyclopregnene and an ester thereof with a carboxylic acid containing up to 15 carbon atoms.

19. A member selected from the group consisting of Δ⁵-3:20-diethylenedioxy - 11α - hydroxy - 11:19 - cyclopregnene and an ester thereof with a carboxylic acid containing up to 15 carbon atoms.

20. A member selected from the group consisting of Δ⁴ - 3:20 - dioxo - 11α:21 - dihydroxy - 11:19 - cyclopregnene, its 3:20-diethyleneketal and an ester thereof with a carboxylic acid containing up to 15 carbon atoms.

No references cited.